(12) United States Patent
Abusleme et al.

(10) Patent No.: US 8,710,149 B2
(45) Date of Patent: *Apr. 29, 2014

(54) THERMOPLASTIC FLUOROPOLYMER COMPOSITION

(75) Inventors: Julio Abusleme, Saronno (IT); Alessio Marrani, Lecco (IT)

(73) Assignee: Solvay Solexis S.p.A., Bollate MI (IT)

( * ) Notice: Subject to any disclaimer, the term of this patent is extended or adjusted under 35 U.S.C. 154(b) by 192 days.

This patent is subject to a terminal disclaimer.

(21) Appl. No.: 12/297,888

(22) PCT Filed: Apr. 23, 2007

(86) PCT No.: PCT/EP2007/053953
§ 371 (c)(1),
(2), (4) Date: Oct. 21, 2008

(87) PCT Pub. No.: WO2007/122217
PCT Pub. Date: Nov. 1, 2007

(65) Prior Publication Data
US 2009/0105420 A1      Apr. 23, 2009

(30) Foreign Application Priority Data
Apr. 25, 2006  (EP) .................................. 06113034

(51) Int. Cl.
*C08L 27/12*     (2006.01)
*C08F 214/26*    (2006.01)

(52) U.S. Cl.
USPC ........... 525/199; 525/200; 525/191; 524/520; 526/242; 526/250

(58) Field of Classification Search
USPC ................................. 525/199, 200
See application file for complete search history.

(56) References Cited

U.S. PATENT DOCUMENTS

| | | | |
|---|---|---|---|
| 3,541,039 A | | 11/1970 | Whiton et al. |
| 4,423,192 A | * | 12/1983 | Van Lang et al. ............ 525/199 |
| 4,584,215 A | | 4/1986 | Bre et al. |
| 5,429,849 A | * | 7/1995 | Lasson et al. ............... 428/36.9 |
| 5,739,233 A | * | 4/1998 | Sokolov et al. .............. 526/245 |
| 6,271,294 B1 | * | 8/2001 | Lasson et al. ............... 524/314 |
| 6,713,141 B2 | * | 3/2004 | Kaulbach et al. ........... 428/36.9 |
| 6,743,865 B2 | * | 6/2004 | Mekhilef et al. ............ 525/199 |
| 2003/0060568 A1 | * | 3/2003 | Albano et al. ............... 525/199 |
| 2003/0198769 A1 | | 10/2003 | Jing et al. |
| 2006/0014904 A1 | * | 1/2006 | Oka et al. .................... 525/199 |
| 2008/0161481 A1 | | 7/2008 | Abusleme et al. |

FOREIGN PATENT DOCUMENTS

| | | |
|---|---|---|
| BE | 739289 | 9/1969 |
| BE | 868231 | 6/1978 |
| GB | 1255081 A | 11/1971 |
| WO | WO2003050183 A1 | 6/2003 |
| WO | WO2007006645 A1 | 1/2007 |
| WO | WO2007006646 A1 | 1/2007 |

OTHER PUBLICATIONS

PCT International Search report dated Aug. 28, 2007 for International Application No. PCT/EP2007/053953 (2 p.).
ASTM D 4440-01 "Standard Test Method for Plastics: Dynamic Mechanical Properties Melt Rheology", Apr. 4, 2006 (6 p.).
ASTM D 4065.01 "Standard Practice for Plastics: Dynamic Mechanical Properties: Determination and Report of Procedures", Jun. 21, 2004 (8 p.).
ASTM D 3418-03 "Standard Test Method for Transition Temperatures of Polymers by Differential Scanning Calorimetry", Nov. 9, 2004 (8 p.).
U.S. Appl. No. 11/995,428, filed Jan. 11, 2008, J. Abusleme et al.
U.S. Appl. No. 11/995,374, filed Jan. 11, 2008, J. Abusleme et al.

* cited by examiner

*Primary Examiner* — Irina Krylova
(74) *Attorney, Agent, or Firm* — Arent Fox LLP

(57) ABSTRACT

This invention pertains to a thermoplastic fluoropolymer composition comprising:
- at least one thermoplastic hydrogen-containing fluoropolymer [polymer (A)]; and
- from 0.1 to 10% by weight of (A) of at least one per(halo) fluoropolymer chosen among tetrafluoroethylene (TFE) copolymers having a dynamic viscosity at a shear rate of 1 rad sec$^{-1}$ of less than 10 Pa sec at a temperature of 280° C. [polymer (B)].

The addition of a TFE copolymer [polymer (B)] of low melt viscosity advantageously enables improvement of rheological behavior of thermoplastic hydrogen-containing fluoropolymer (A), making possible processing in less severe conditions and yielding final parts with outstanding surface aspect and good homogeneity and coherency.

Still objects of the invention are a process for manufacturing said thermoplastic fluoropolymer composition and the articles, such as shaped articles, films, cable sheathing, pipes, flexible pipes, hollow bodies comprising said thermoplastic fluoropolymer composition.

10 Claims, 1 Drawing Sheet

Fig. 0001
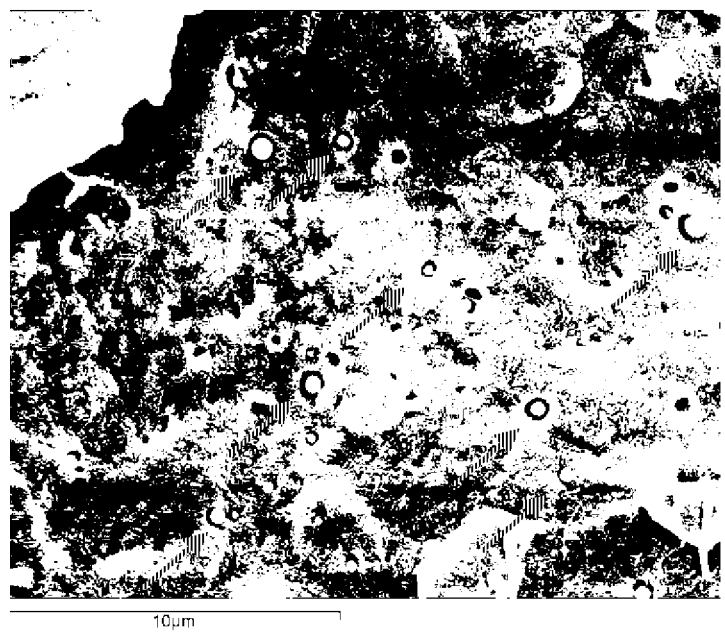
Fig. 0002
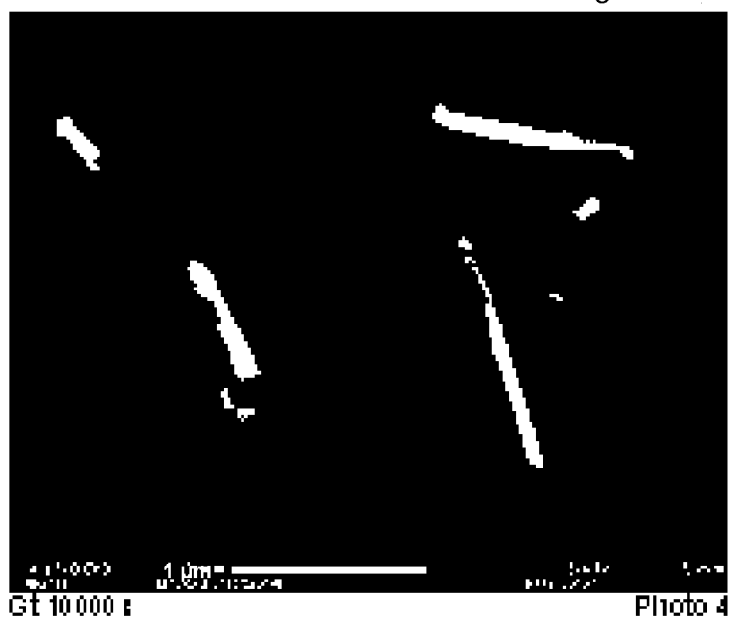

THERMOPLASTIC FLUOROPOLYMER COMPOSITION

CROSS-REFERENCE TO RELATED APPLICATIONS

This application is a U.S. national stage application under 35 U.S.C. §371 of International Application No. PCT/EP2007/053953, filed Apr. 23, 2007, which claims priority to European Application No. 06113034.0, filed Apr. 25, 2006, all of these applications being herein incorporated by reference in their entirety for all purposes.

TECHNICAL FIELD

The invention pertains to a thermoplastic fluoropolyer composition, to the articles therefrom and to a process for manufacturing said thermoplastic fluoropolyer composition.

BACKGROUND ART

Fluorocarbon resins, in particular vinylidene fluoride resins, are well known for their outstanding mechanical properties within a broad range of temperature, excellent resistance to high temperature, organic solvents and to various chemically aggressive environments.

Thanks to their properties, they are commonly used for manufacturing articles by extrusion or injection molding, e.g. for producing pipes, tubes, fittings, films, coatings, cable sheathings, flexible pipes and the like.

To further improve mechanical properties of these polymers, it is well known to increase their molecular weight, or, in other words, to increase their melt viscosity. Thus, although fluoropolyer of high molar mass (and thus high melt viscosity) are preferable because of improved mechanical properties, processing these materials is more difficult. In particular, in extrusion process, they display rheology problems, accounting for increased energy consumption during extrusion and more severe extrusion conditions to be applied (with consequent risks of thermal degradation of the polymer). In this case, finished parts (extrusion or injection molded) made from these fluoropolyer have generally surface defects like cracks, shark-skin, fish-eyes and the like.

Processing aids have been thus largely used to obviate these problems; nevertheless, they have several drawbacks. Due to their limited thermal stability at processing temperature, benefits of their addition are lost and fumes are released during processing; thermal degradation residues generate in final parts structural defects and voids that can be detrimental to mechanical properties.

Perfluoropolymers have been thus employed to aid the extrusion processes and improve the final surface characteristics of the extrudate.

Thus,
Patent Citation 0001: U.S. Pat. No. 4,423,192 (UGINE KUHLMANN (FR)). 1983 Dec. 27.
discloses lubricated polyvinylidene fluoride compositions comprising from 0.1 to 10% by weight of tetrafluoroethylene homopolymers or copolymers, containing at least 90 mole percent of tetrafluoroethylene groups, of low molecular weight.
Patent Citation 0002: GB 1255081 (PENNWALT CORP (US)). 1971 Nov. 24.
discloses vinylidene fluoride polymer compositions comprising high-molecular weight tetrafluoroethylene homopolymers or normally solid high-molecular weight co-polymers of tetrafluoroethylene containing at least 90 mole percent of tetrafluoroethylene units.
Patent Citation 0003: WO WO 2003050183 A (3M INNOVATIVE PROPERTIES). 2003 Jun. 19.
discloses, inter alia, melt processable fluorothermoplastic compositions comprising a major amount of a first semi-crystalline fluorinated copolymer and a minor amount of a second fluoropolymer effective to reduce melt defects in the compositions.
Finally,
Patent Citation 0004: US 20030198769 (3M INNOVATIVE PROPERTIES). 2003 Oct. 23.
discloses fluoropolymer blends combinations comprising a partially-fluorinated thermoplastic polymer and a perfluorinated thermoplastic polymer.

Despite these attempts, there is always a great need for composition wherein a uniform dispersion of the perfluoropolymer acting as processing aid is achieved. When mixing the processing aid with the matrix in the composition of the prior art, phase-separated domains of large size and irregular shape are obtained: this uneven distribution prevents the perfluoropolymer to efficiently improve processing. Thus this approach fails to provide the targeted advantages, and, notwithstanding the addition of the processing aid, it is not possible to process the composition materials at higher output rates while maintaining satisfactory quality in final parts finish and keeping good mechanical properties.

This invention thus aims at providing a thermoplastic fluoropolymer composition in which the efficiency of the perfluoropolymer as processing aid in improving rheological behavior is increased and in which the mechanical properties are not negatively affected.

DISCLOSURE OF INVENTION

This problem and others is remarkably solved by the thermoplastic fluoropolymer composition of the invention, comprising:
  at least one thermoplastic hydrogen-containing fluoropolymer [polymer (A)]; and
  from 0.1 to 10% by weight of (A) of at least one per(halo) fluoropolymer chosen among tetrafluoroethylene (TFE) copolymers having a dynamic viscosity at a shear rate of 1 rad×sec$^{-1}$ of less than 10 Pa×sec at a temperature of 280° C. [polymer (B)].

Dynamic viscosity is advantageously determined according to ASTM D 4440 standard, following equations listed in Practice ASTM D 4065 to determine "Complex viscosity, $\eta^*$" at 1 rad×sec$^{-1}$.

Dynamic viscosity is typically measured with a controlled strain rheometer, employing an actuator to apply a deforming strain to the sample and a separate transducer to measure the resultant stress developed within the sample, using the parallel plate fixture.

Another object of the invention is a process for manufacturing said thermoplastic fluoropolymer composition.

Still objects of the invention are the articles, such as shaped articles, films, cable sheathing, pipes, flexible pipes, hollow bodies comprising said thermoplastic fluoropolymer composition.

The addition of a TFE copolymer [polymer (B)] of low melt viscosity advantageously enables improvement of rheological behavior of thermoplastic hydrogen-containing fluoropolymer (A), making possible processing in less severe conditions and yielding final parts with outstanding surface aspect and good homogeneity and coherency. Thanks to the low viscosity of TFE copolymer, the polymer (B) advantageously melts and flows during processing assuring optimal distribution within the overall thermoplastic polymer (A) matrix and typically enabling discrete domains of small size and regular shape to be formed.

The process according to the invention is advantageously particularly efficient in assuring optimal distribution of the polymer (B) in the thermoplastic fluoropolymer composition, which enables increased efficiency of polymer (B) as processing aid and avoids negative impact on mechanical properties.

BRIEF DESCRIPTION OF THE FIGURES

FIG. 1 is a SEM picture (magnification: 10 000×) of a specimen sampled from an extruded rod of the thermoplastic composition of example 1b), after fragile rupture at liquid nitrogen temperature.

FIG. 2 is a SEM picture (magnification: 10 000×) of a specimen sampled from an extruded rod of the thermoplastic composition of comparative example 2b), after fragile rupture at liquid nitrogen temperature.

Preferably the thermoplastic fluoropolymer composition of the invention is multi-phase. The term multi-phase is to be intended to denote a composition wherein the TFE copolymer (B) is immiscible with the thermoplastic hydrogen-containing fluoropolymer (A), so that the composition possesses phase-separated domains mainly comprising polymer (B) in a continuous phase mainly comprising polymer (A).

For the purpose of the invention, the term "immiscible TFE copolymer (B)" is intended to denote any TFE copolymer (B) yielding a phase-separated composition, when mixed with the thermoplastic hydrogen-containing fluoropolymer (A) in the composition according to the invention, which shows two distinct glass transition temperatures, when analyzed by Differential Scanning Calorimetry (DSC) at a heating rate of 10° C./min, according to ASTM D 3418.

The term "continuous phase mainly comprising polymer (A)" is intended to denote a continuous phase comprising polymer (A) as major component, i.e. comprising more than 50%, preferably more than 60%, still more preferably more than 75% by weight of (A).

The term "phase-separated domains mainly comprising polymer (B)" is intended to denote a phase comprising polymer (B) as major component, i.e. comprising more than 50%, preferably more than 60%, still more preferably more than 75% by weight of (B).

The term "phase-separated domain" is intended to denote three-dimensional volume element of the composition of the invention, wherein the concentration of polymer (B) is at least 25% higher, preferably 30% higher, still more preferably 50% higher than the concentration of polymer (B) in the continuous phase mainly comprising polymer (A).

75% by volume of the phase-separated domains as above specified have a maximal dimension not exceeding advantageously 1 µm.

The term "maximal dimension" is intended to denote the maximal value of the diameter of a cross-sectional area, associated to each of the possible differently oriented cross-sections of the phase-separated domain.

A cross section is to be intended as the intersection of the phase-separated domain in three-dimensional space with a plane. From a practical point of view, when cutting into slices, many parallel cross sections are obtained.

The diameter of a cross-sectional area is defined as the diameter of the smallest circle which the cross-sectional area can be comprised in.

Maximal dimension of the phase-separated domains may be preferably determined by SEM microscopy and image recognition on samples of the composition, obtained from microtomic cuts or fractures, realized at liquid nitrogen temperature.

Volume percent of phase-separated domains having maximal dimension not exceeding a relevant value is calculated by measuring surface area of such domains with respect to the total area of domains in the microtomic cut or fracture analysed by SEM microscopy and image recognition.

Within the context of the present invention the mention "at least one thermoplastic hydrogen-containing fluoropolymer (A)" is intended to denote one or more than one polymer (A).

Mixtures of polymers (A) can be advantageously used for the purposes of the invention.

In the rest of the text, the expressions "thermoplastic hydrogen-containing fluoropolymer" and "polymer (A)" are understood, for the purposes of the present invention, both in the plural and the singular, that is to say that the inventive composition may comprise one or more than one polymer (A).

The polymer (A) of the invention should be thermoplastic.

The term "thermoplastic" is understood to mean, for the purposes of the present invention, polymers existing, at room temperature, below their glass transition temperature, if they are amorphous, or below their melting point if they are semi-crystalline, and which are linear (i.e. not reticulated). These polymers have the property of becoming soft when they are heated and of becoming rigid again when they are cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Polymer resins serving as a base constituent for obtaining true elastomers are in general amorphous products having a glass transition temperature ($T_g$) below room temperature. In most cases, these products correspond to copolymers having a $T_g$ below 0° C. and including reactive functional groups (optionally in the presence of additives) allowing the true elastomer to be formed.

Preferably, the thermoplastic hydrogen-containing fluoropolymer [polymer (A)] of the invention is semi-crystalline.

The term "semi-crystalline" is intended to denote a polymer having a heat of fusion of more than 1 J/g when measured by Differential Scanning Calorimetry (DSC) at a heating rate of 10° C./min, according to ASTM D 3418.

Preferably, the polymer (A) of the invention has a heat of fusion of at least 4 J/g, more preferably of at least 8 J/g.

To the purpose of the present invention, "fluoropolymer" is intended to denote any polymer comprising more than 15% moles of recurring units derived from at least one ethylenically unsaturated monomer comprising at least one fluorine atom (hereinafter, fluorinated monomer).

The fluoropolymer comprises preferably more than 20% moles, more preferably more than 30% moles of recurring units derived from the fluorinated monomer. The fluorinated monomer can further comprise one or more other halogen atoms (Cl, Br, I). Shall the fluorinated monomer be free of hydrogen atom it is designated as per(halo)fluoromonomer. Shall the fluorinated monomer comprise at least one hydrogen atom it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoropolymer may comprise recurring units derived one first monomer, said monomer being a fluorinated monomer as above described, and at least one other monomer (hereinafter, the comonomer).

Hereinafter, the term comonomer should be intended to encompass both one comonomer and two or more comonomers.

The comonomer can notably be either hydrogenated (i.e. free of fluorine atom) or fluorinated (i.e. containing at least one fluorine atom).

Non limitative examples of suitable hydrogenated comonomers are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers are notably:

$C_3$-$C_8$ fluoro- and/or perfluoroolefins, such as hexafluoropropene, pentafluoropropylene, and hexafluoroisobutylene;

$C_2$-$C_8$ hydrogenated monofluoroolefins, such as vinyl fluoride;

1,2-difluoroethylene, vinylidene fluoride and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

fluoroalkylvinylethers complying with formula $CF_2=CFOR_{f1}$, in which $R_{f1}$ is a $C_1$-$C_6$ fluoro- or perfluoroalkyl, e.g. $-CF_3$, $-C_2F_5$, $-C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;

fluorodioxoles, of formula:

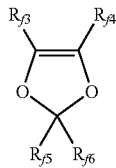

wherein each of $R_{f3}$, $R_{f4}$, $R_{f5}$, $R_{f6}$, equal or different each other, is independently a fluorine atom a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

By "hydrogen-containing fluoropolymer" it is meant a fluoropolymer as above defined comprising recurring units derived from at least one hydrogen-containing monomer. Said hydrogen-containing monomer may be the same monomer as the fluorinated monomer or can be a different monomer.

Thus, this definition encompasses notably copolymers of one or more per(halo)fluoromonomer (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers.

The hydrogen-containing fluoropolymer is preferably chosen among:

(A-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. No. 3,624,250 and U.S. Pat. No. 4,513,129);

(A-2) Vinylidene fluoride (VdF) polymers, optionally comprising reduced amounts, generally comprised between 0.1 and 15% by moles, of one or more fluorinated comonomer(s) (see for instance U.S. Pat. No. 4,524,194 and U.S. Pat. No. 4,739,024), and optionally further comprising one or more hydrogenated comonomer(s); and mixtures thereof.

The CTFE or TFE copolymers (A-1) preferably comprise:
(a) from 35 to 65%, preferably from 45 to 55%, more preferably from 48 to 52% by moles of ethylene (E);
(b) from 65 to 35%, preferably from 55 to 45%, more preferably from 52 to 48% by moles of chlorotrifluoroethylene (CTFE) (for the ECTFE polymers, hereinafter) and/or tetrafluoroethylene (TFE) (for the ETFE polymers, herein after); and optionally;
(c) from 0.1 to 30%, by moles, preferably 0.1 to 10% by moles, more preferably 0.1 to 5% by moles, based on the total amount of monomers (a) and (b), of one or more fluorinated comonomer(s) (c1) and/or hydrogenated comonomer(s) (c2).

Among fluorinated comonomers (c1), we can for example mention (per)fluoroalkylvinylethers, perfluoroalkylethylenes (such as perfluorobutylethylene), (per)fluorodioxoles as described in U.S. Pat. No. 5,597,880, vinylidenefluoride (VdF). Among them preferred (c1) comonomer is perfluoropropylvinylether of formula $CF_2=CFO-C_3F_7$.

Among comonomers (c), hydrogenated comonomers (c2) are preferred. As non limitative examples of hydrogenated comonomers (c2), mention may be notably made of those having the general formula:

$$CH_2=CH-(CH_2)_nR_1 \qquad (I)$$

wherein $R_1=OR_2$, or $-(O)_tCO(O)_pR_2$ wherein t and p are integers equal to 0, 1 and $R_2$ is a hydrogenated radical $C_1$-$C_{20}$ from 1 to 20 carbon atoms, of alkyl type, linear or branched when possible, or cycloalkyl, optionally containing heteroatoms and/or chlorine atoms, the heteroatoms preferably being O or N, $R_2$ optionally contains one or more functional groups, preferably selected from OH, COOH, epoxide, ester and ether, $R_2$ optionally contains double bonds, or $R_2$ is H, n is an integer in the range 0-10. Preferably $R_2$ is of alkyl type from 1 to 10 carbon atoms containing functional groups of hydroxide type, n is an integer in the range 0-5.

The preferred hydrogenated comonomers (c2) are selected from the following classes:

1. Acrylic monomers having the general formula:

$$CH_2=CH-CO-O-R_2$$

wherein $R_2$ has the above mentioned meaning. As non limitative examples of suitable acrylic monomers, mention can be notably made of ethylacrylate, n-butylacrylate, acrylic acid, hydroxyethylacrylate, hydroxypropylacrylate, (hydroxy)ethylhexylacrylate.

2. Vinylether monomers having the general formula:

$$CH_2=CH-O-R_2$$

wherein $R_2$ has the above mentioned meaning. As non limitative examples of suitable vinylether monomers, mention can be notably made of propylvinylether, cyclohexylvinylether, vinyl-4-hydroxybutylether.

3. Vinyl monomers of the carboxylic acid having the general formula:

$$CH_2=CH-O-CO-R_2$$

wherein $R_2$ has the above mentioned meaning. As non limitative examples of suitable vinyl monomers of the carboxylic acid, mention can be notably made of vinylacetate, vinylpropionate, vinyl-2-ethylhexanoate.

4. Unsaturated carboxylic acid monomers having the general formula:

$$CH_2=CH-(CH_2)_n-COOH$$

wherein n has the above mentioned meaning. As non limitative example of suitable unsaturated carboxylic acid monomer, mention can be notably made of vinylacetic acid.

More preferred comonomer (c2) is n-butylacrylate.

Among A-1 polymers, ECTFE polymers are preferred.

The melt index of the ECTFE is advantageously at least 0.01, preferably at least 0.05, more preferably at least 0.1 g/10 min.

The melt index of the ECTFE is advantageously at most 50, preferably at most 10, more preferably at most 5 g/10 min, even more preferably at most 1 g/10 min.

The melt index of ECTFE is measured in accordance with modified ASTM test No. 1238, run at 275° C., under a piston load of 2.16 kg.

The ECTFE has a melting point advantageously of at least 150° C. and at most 265° C.

The melting point is determined by Differential Scanning Calorimetry (DSC) at a heating rate of 10° C./min, according to ASTM D 3418 Standard.

Particularly adapted to thermoplastic fluoropolymer composition of the invention is ECTFE available from Solvay Solexis Inc., Thorofare, N.J., USA, under the tradename HALAR® and VATAR®.

More preferably, the hydrogen-containing fluoropolymer is a VdF polymer (A-2).

The VdF polymer (A-2) preferably comprises:
(a') at least 60% by moles, preferably at least 75% by moles, more preferably 85% by moles of vinylidene fluoride (VdF);
(b') optionally from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and
(c') optionally from 0.1 to 5%, by moles, preferably 0.1 to 3% by moles, more preferably 0.1 to 1% by moles, based on the total amount of monomers (a') and (b'), of one or more fluorinated or hydrogenated comonomer(s).

As non limitative examples of the VdF polymers useful in the present invention, mention can be notably made of homopolymer of VdF, VdF/TFE copolymer, VdF/TFE/HFP copolymer, VdF/TFE/CTFE copolymer, VdF/TFE/TrFE copolymer, VdF/CTFE copolymer, VdF/HFP copolymer, VdF/TFE/HFP/CTFE copolymer, VdF/TFE/perfluorobutenoic acid copolymer, VdF/TFE/maleic acid copolymer and the like.

The melt index of the VdF polymer is advantageously at least 0.01, preferably at least 0.05, more preferably at least 0.1 g/10 min.

The melt index of the VdF polymer is advantageously at most 10, preferably at most 7.5, more preferably at most 5 g/10 min, even more preferably at most 1 g/10 min.

The melt index of VdF polymer is measured in accordance with ASTM test No. 1238, run at 230° C., under a piston load of 5 kg.

The VdF polymer has a melting point advantageously of at least 120° C., preferably at least 125° C., more preferably at least 130° C.

The VdF polymer has a melting point advantageously of at most 190° C., preferably at most 185° C., more preferably at most 180° C.

The melting point ($T_{m2}$) is determined by DSC, at a heating rate of 10° C./min, according to ASTM D 3418.

According to an embodiment of the invention, the polymer (A) is a mixture of at least one VdF homopolymer and at least one VdF copolymer chosen among the group consisting of VdF copolymers comprising from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

The mixture according to this embodiment of the invention advantageously comprises:
1) at least one VdF homopolymer in weight proportions of at least approximately 25%, preferably higher than 30% and not exceeding approximately 75%, preferably lower than 70%;
2) at least one VdF copolymer as above detailed in weight proportions of at least 25%, preferably higher than 30%, and not exceeding approximately 75%, preferably lower than 70%.

For the purpose of the invention, the term "per(halo)fluoropolymer" is intended to denote a fluoropolymer substantially free of hydrogen atoms.

The term "substantially free of hydrogen atom" is understood to mean that the per(halo)fluoropolymer consists essentially of recurring units derived from ethylenically unsaturated monomers comprising at least one fluorine atom and free of hydrogen atoms (per(halo)fluoromonomer).

The per(halo)fluoropolymer is advantageously melt-processable.

For the purposes of the present invention, by the term "melt-processable" is meant that the per(halo)fluoropolymer can be processed (i.e. fabricated into shaped articles such as films, fibers, tubes, wire coatings and the like) by conventional melt extruding, injecting or casting means.

The term tetrafluoroethylene (TFE) copolymer is intended to encompass per(halo)fluoropolymers comprising recurring units derived from tetrafluoroethylene and from at least one other per(halo)fluoromonomer (PFM) as above described different from TFE The TFE copolymer [polymer (B)] of the invention comprises advantageously at least 0.5% by moles, preferably at least 5% by moles, more preferably at least 7% by moles of recurring units derived from the per(halo)fluoromonomer (PFM) different from TFE, with respect to the total moles of recurring units.

The TFE copolymer [polymer (B)] of the invention comprises advantageously at most 30% by moles, preferably at most 25% by moles, more preferably at most 23% by moles of recurring units derived from the per(halo)fluoromonomer (PFM) different from TFE, with respect to the total moles of recurring units.

Per(halo)fluoromonomers (PFM) different from TFE are notably chosen among:
$C_3$-$C_8$ perfluoroolefins, such as hexafluoropropene (HFP); chloro- and/or bromo- and/or iodo-$C_2$-$C_6$ per(halo)fluoroolefins, like chlorotrifluoroethylene;
per(halo)fluoroalkylvinylethers complying with general formula $CF_2=CFOR_{f3}$ in which $R_{f3}$ is a $C_1$-$C_6$ per(halo)fluoroalkyl, such as —$CF_3$, —$C_2F_5$, —$C_3F_7$;
per(halo)fluoro-oxyalkylvinylethers complying with general formula $CF_2=CFOX_{01}$, in which $X_{01}$ is a $C_1$-$C_{12}$ per(halo)fluorooxyalkyl having one or more ether groups, like perfluoro-2-propoxy-propyl group;
per(halo)fluoro-methoxy-alkylvinylethers complying with general formula $CF_2=CFOCF_2OR_{f4}$ in which $R_{f4}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$;
per(halo)fluorodioxoles of formula:

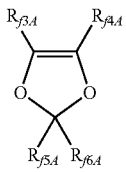

wherein each of $R_{f3A}$, $R_{f4A}$, $R_{f5A}$, $R_{f6A}$, equal of different each other, is independently a fluorine atom, a $C_1$-$C_6$ perfluoroalkyl group, optionally comprising one or more oxygen atom e.g. —CF 3, —$C_2F_5$, —$C_3F_7$, —$OCF_3$, —$OCF_2$ $CF_2OCF_3$.

Preferred TFE copolymers are those comprising recurring units derived from at least one per(halo)fluoromonomer (PFM) chosen among the group consisting of:
1. perfluoroalkylvinylethers complying with formula $CF_2=CFOR_{f1'}$, in which $R_{f1'}$, is a $C_1$-$C_6$ perfluoroalkyl, e.g. —$CF_3$, —$C_2F_5$, —$C_3F_7$; and/or
2. perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl; and/or
3. $C_3$-$C_8$ perfluoroolefins, such as hexafluoropropylene.
4. per(halo)fluorodioxoles of formula:

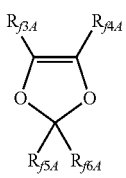

wherein each of $R_{f3A}$, $R_{f4A}$, $R_{f5A}$, $R_{f6A}$, equal of different each other, is independently a fluorine atom a $C_1$-$C_6$ perfluoroalkyl group, optionally comprising one or more oxygen atom e.g. —$CF_3$, —$C_2F_5$, —$C_3F_7$, —$OCF_3$, —$OCF_2$ $CF_2OCF_3$, preferably a per(halo)fluorodioxole as above described, wherein $R_{f3A}$ and $R_{f4A}$ are fluorine atoms and $R_{f5A}$ and $R_{f6A}$ are perfluoromethyl groups (—$CF_3$) [perfluoro-2,2-dimethyl-1,3-dioxole (PDD)], or wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

More preferred TFE copolymers are those comprising recurring units derived from at least one perfluoroalkylvinylether (PAVE) complying with formula $CF_2=CFOR_{f1'}$, in which $R_{f1'}$ is a $C_1$-$C_6$ perfluoroalkyl.

The expression "at least one perfluoroalkylvinylether" is understood to mean that the TFE/PAVE copolymer can comprise recurring units derived from one or more than one perfluoroalkylvinylether as above described.

As used herein, the term perfluoroalkylvinylether is understood, for the purposes of the present invention, both in the plural and the singular.

Good results have been obtained with TFE/PAVE copolymers comprising recurring units derived from at least one perfluoroalkylvinylether complying with formula $CF_2=CFOR_{f7'}$, in $R_{f7'}$ is a group chosen among —$CF_3$, —$C_2F_5$, —$C_3F_7$.

Excellent results have been obtained with TFE/PAVE copolymers comprising recurring units derived from perfluoromethylvinylether (of formula $CF_2=CFOCF_3$) (MVE, hereinafter).

TFE/PAVE copolymers may also comprise recurring units derived from at least one per(halo)fluoromonomer different from TFE and perfluoroalkylvinylether as above described. In particular, TFE/PAVE copolymers may comprise recurring units derived from perfluoro-oxyalkylvinylethers as above described, and/or $C_3$-$C_8$ perfluoroolefins as above described (e.g. hexafluoropropylene), and/or per(halo)fluorodioxoles as above described.

According to an embodiment of the invention, polymer (B) is advantageously chosen among TFE/PAVE copolymers consisting essentially of recurring units derived from TFE and at least one perfluoroalkylvinylether as above detailed.

It is understood that the TFE/PAVE copolymers can comprises other moieties, such as end-groups, defects and the like, which do not substantially affect the properties of said materials.

According to this embodiment of the invention, polymer (B) is preferably a copolymer consisting essentially of recurring units derived from TFE and from MVE The polymer (B) according to this embodiment is more preferably a TFE/MVE copolymer consisting essentially of:
from 3 to 25% by moles, preferably from 5 to 20% by moles, more preferably from 8 to 18% by moles, even more preferably from 10 to 15% by moles of recurring units derived from MVE; and
from 97 to 75% by moles, preferably from 95 to 80% by moles, more preferably from 92 to 82% by moles, even more preferably from 90 to 85% by moles of recurring units derived from TFE The polymer (B) of the invention has a dynamic viscosity at a shear rate of 1 rad×$sec^{-1}$ of less than 10 Pa×sec, preferably of less than 8 Pa×sec, most preferably of less than 6 Pa×sec, at a temperature of 280° C.

Dynamic viscosity is advantageously determined according to ASTM D 4440 standard, following equations listed in Practice ASTM D 4065 to determine "Complex viscosity, η*" at 1 rad×$sec^{-1}$.

Dynamic viscosity is typically measured with a controlled strain rheometer, employing an actuator to apply a deforming strain to the sample and a separate transducer to measure the resultant stress developed within the sample, using the parallel plate fixture.

The composition of the invention comprises the polymer (B) in an amount of advantageously at least 0.1%, preferably at least 0.2%, more preferably at least 0.3%, most preferably at least 0.5% by weight of polymer (A).

The composition of the invention comprises the polymer (B) in an amount of advantageously at most 10%, preferably at most 8%, more preferably at most 7.5%, even more preferably at most 5%, most preferably at most 3% by weight of polymer (A).

Good results have been obtained with thermoplastic fluoropolymer composition comprising from 0.3 to 5% of polymer (B) by weight of polymer (A). Best results have been achieved with thermoplastic fluoropolymer composition comprising from 0.5 to 3% of polymer (B) by weight of polymer (A).

Optionally, the thermoplastic fluoropolymer composition described above can further comprise one of more additives chosen among plasticizers, pigments, filling materials, electrically conductive particles, lubricating agents, mold release agents, heat stabilizer, anti-static agents, extenders, reinforcing agents, organic and/or inorganic pigments like $TiO_2$, carbon black, acid scavengers, such as MgO, flame-retardants, smoke-suppressing agents and the like.

By way of non-limiting examples of filling materials, mention may be made of mica, alumina, talc, carbon black, glass fibers, carbon fibers, graphite in the form of fibers or of powder, carbonates such as calcium carbonate, macromolecular compounds and the like.

Pigments useful in the composition of the invention notably include, or will comprise, one or more of the following: titanium dioxide which is available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Englehard Industries, Edison, N.J., USA.

According to an embodiment of the invention, the composition further comprises a plasticizer.

Plasticizers suitable for the composition of the invention may be chosen from the usual monomeric or polymeric plasticizers for fluoropolymers.

Plasticizers described in

Patent Citation 0005: U.S. Pat. No. 3,541,039 (PENNWALT COR$^P$). 1970 Nov. 17.

and those described in

Patent Citation 0006: U.S. Pat. No. 4,584,215 (INST FRANCAIS DU PETROL (FR)). 1986 Apr. 22.

are suitable for the compositions of the invention.

The plasticizers are incorporated without any difficulty in the compositions of the invention defined above and produce compositions whose impact strength, especially at low temperature, is advantageously improved. In other words, plasticizers can be advantageously used in the compositions of the invention to improve the low temperature behaviour of final parts made from inventive compositions, especially when these parts are submitted to extreme operating temperatures.

Among monomeric plasticizers, mention can be notably made of dibutyl sebacate (DBS), N-n-butylsulphonamide, acetyl-tri-n-butylcitrate of formula:

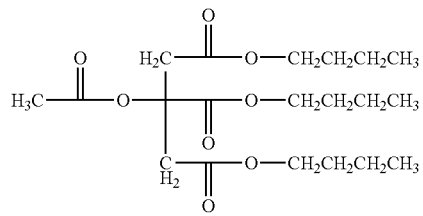

and dibutoxyethyladipate of formula:

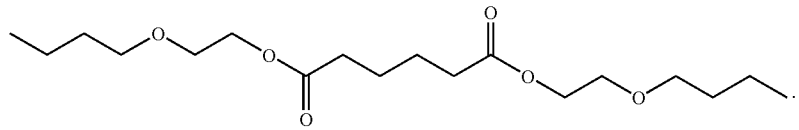 [SMILES: CCCCOCCOC(=O)CCCCC(=O)OCCOCCCC]

A plasticizer which has shown itself to be particularly advantageous within the context of the present invention is DBS ($C_4H_9$—OOC—$(CH_2)_8$—COO—$C_4H_9$).

Among polymeric plasticizers, mention can be notably made of polymeric polyesters such as those derived from adipic, azelaic or sebacic acids and diols, and their mixtures, but on condition that their molecular mass is at least approximately 1500, preferably at least 1800, and not exceeding approximately 5000, preferably lower than 2500. Polyesters of excessively high molecular mass result, in fact, in compositions of lower impact strength.

Should the composition of the invention comprise a plasticizer, the amount of plasticizer is of advantageously at least 1%, preferably of at least 2% and advantageously of at most 20%, preferably of at most 10% by weight of polymer (A).

Another aspect of the present invention concerns a process for manufacturing the thermoplastic fluoropolymer composition as above described, said process comprising mixing:

1. the thermoplastic hydrogen-containing fluoropolymer [polymer (A)], as above described;
2. the TFE copolymer [polymer (B)], as above described; and
3. optionally, other additives or filling materials.

Additives of filling materials which can be used are those above described.

According to a preferred variant of the invention, the process comprises advantageously mixing by dry blending and/or melt compounding the polymer (A) and the polymer (B).

Preferably, the process comprises melt compounding polymer (A) and the polymer (B).

Advantageously, the polymer (A) and the polymer (B) are melt compounded in continuous or batch devices. Such devices are well-known to those skilled in the art.

Examples of suitable continuous devices to melt compound the thermoplastic fluoropolymer composition of the invention are notably screw extruders. Thus, the polymer (A) and the polymer (B) and optionally other ingredients, are advantageously fed in an extruder and the thermoplastic fluoropolymer composition is extruded.

This operating method can be applied either with a view to manufacturing finished product such as, for instance, hollow bodies, pipes, laminates, calendared articles, or with a view to having available granules containing the desired composition, optionally additives and fillers, in suitable proportions in the form of pellets, which facilitates a subsequent conversion into finished articles. With this latter aim the thermoplastic fluoropolymer composition of the invention is advantageously extruded into strands and the strands are chopped into pellets.

Optionally, fillers, heat stabilizers, anti-static agents, extenders, reinforcing agents, organic and/or inorganic pigments like $TiO_2$, carbon black, acid scavengers, such as MgO, flame-retardants, smoke-suppressing agents may be added to the composition during the compounding step.

Preferably, the polymer (A) and the polymer (B) are melt compounded in a twin-screw extruder. Examples of suitable extruders well-adapted to the process of the invention are those available from Werner and Pfleiderer and from Farrel.

Still an object of the invention is an article, such as shaped articles, films, cable sheathing, pipes, flexible pipes, hollow bodies, comprising the thermoplastic fluoropolymer composition as above described, or obtainable by the process as above described.

Advantageously, the article is an injection moulded article, an extrusion moulded article, a machined article, a coated article or a casted article.

Non-limitative examples of articles are shaped article, pipes, fittings, housings, films, membranes, coatings.

Articles of the invention can advantageously find application in the oil and gas industry. Articles for oil field applications include shock tubing, encapsulated injection tubing, coated rod, coated control cables, down-hole cables, flexible flow lines and risers.

Articles of the invention are particularly suitable for the CPI market, that is to say for the so-called chemical process industry, wherein, typically:

corrosion-resistant linings comprising the composition of the invention can be applied by powder coating, sheet lining, extruded lining, rotational lining or other standard technique;

membranes comprising the composition of the invention can be made with varying degrees of porosity and manufacturing methods for use in water purification, foodstuffs dehydration, filtration of chemicals, and the like;

pipes, valves, pumps and fittings comprising the composition as above described can be used in chemical process equipment when excellent temperature and chemical resistance are required. Small pieces can economically be made entirely of the composition of the invention. Extruded or molded components include tubes, pipes, hose, column packing, pumps, valves, fittings, gaskets, and expansion joints.

Also, articles of the invention are advantageously suitable for building and architecture applications; in this domain, typically:

flexible corrugated ducts comprising the composition of the invention advantageously prevent corrosion from $SO_2$ and other products of combustion in residential chimney flues;

pipes and fittings comprising the composition of the invention advantageously provide for long life hot water service.

Moreover, articles of the invention can advantageously find application in the semi-conductors industry, where the composition of the invention can, for instance, act as strong, tough, high purity material used routinely as structural materials in wet bench and wafer processing equipment. Moreover, the composition of the invention is suitable for construction of fire-safe wet benches and for windows, access panels, mini-environments, site glasses, and any other area within the cleanroom where transparency is needed.

The invention will be described in greater details with reference to the following examples whose purpose is merely illustrative and not limitative of the scope of the invention.

EXAMPLE 1A

Preparation of a per(halo)fluoropolymer

A 22 l AISI 316 autoclave equipped with a stirrer working at 500 rpm was evacuated and 14.5 l of demineralized water and 127 g of a microemulsion formed of: 20% by weight of GALDEN® D02, having the formula:

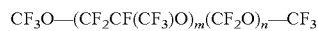

where m/n=20 and average molecular weight of 450;
30% by weight of a surfactant having the formula:

where n1=1.0% m1, q=9.1% m1 and average molecular weight of 550;
the remaining part being formed by $H_2O$,
were introduced in said autoclave.

The autoclave was evacuated and then heated to the reaction temperature of 75° C. Then ethane was charged as chain transfer agent with a delta pressure of 2.0 bar, perfluoromethylvinylether (MVE) was charged with a delta pressure of 6.3 bar, and afterwards a tetrafluoroethylene (TFE)/MVE mixture containing 13% by moles of MVE was fed to achieve the reaction pressure set point of 21 absolute Bar.

The polymerization was initiated by introducing 315 ml of an ammonium persulfate (APS) solution, obtained by dissolving 14.5 g APS in 1 liter of demineralized water.

The reaction pressure was kept constant by feeding the monomer mixture TFE/MVE containing 13% by moles of MVE above described. After 290 minutes of reaction, the polymerization was stopped, the reactor was cooled down to room temperature and the residual pressure was released.

A latex containing 329 (g polymer)/(kg latex) was discharged and coagulated with $HNO_3$; the polymer was then separated, washed with demineralized water and dried in an oven at 120° C. for about 16 hours.

The so-obtained powder was found to have a dynamic viscosity of 5 Pa×s at 280° C. and at a shear rate of 1 rad× $sec^{-1}$, a $T_{m2}$ of 205.9° C., a $\Delta H_{2f}$=6.279 J/g and was found to be composed of 13% by moles of MVE and 87% by moles of TFE

EXAMPLE 1B

Melt Compounding and Disk Injection Molding of a Composition of a Thermoplastic Hydrogen Containing Fluoropolymer and per(halo)fluoropolymer A blend comprising a mixture of SOLEF® 6015 (dynamic viscosity of 72000 Pa×s at 230° C. and at a shear rate of 1 $s^{-1}$), and 1% by weight of the TFE/MVE copolymer of example 1a) were dry mixed for 16 hours in a rotary blender and melt compounded in a Braebender conical twin-screw Hastelloy C-276 extruder having a final diameter of 18 mm. Temperature profile and extrusion parameters used are detailed in Table 1

[Table 0001]
[Table]

TABLE 1

| Zone 1 temperature (barrel) | (° C.) | 200 |
|---|---|---|
| Zone 2 temperature (barrel) | (° C.) | 210 |
| Zone 3 temperature (barrel) | (° C.) | 220 |
| Zone 4 temperature (head) | (° C.) | 230 |
| Torque | (Nm) | 50-60 |
| Pressure | (bar) | 75-85 |
| Melt temperature | (° C.) | 230 |
| Throughput rate | (kg/h) | 3-5 |
| Screw speed | (rpm) | 15 |

FIG. 1 shows a SEM picture (magnification: 10000×) of a specimen taken from an extruded rod of the composition after fragile rupture at liquid nitrogen temperature whiter spots (evidenced by black and white arrows) are substantially spherical discrete domains of the TFE/MVE copolymer, whose maximal dimension does not exceed 1 μm.

As it can be seen in FIG. 1, finely subdivided domains were present in the extruded rod. It is thus obvious that these small domains (excellent fine distribution) present in the pellets before using them to prepare articles will be also presented in final shaped articles.

The composition was then injection moulded to prepare disks having a diameter of 102 nm and a thickness of 3 mm. The composition was injection moulded in a Negri Bossi press. The diameter of the screw was 30 mm with a length-to-diameter ratio of 24 and the clamping force was of 100 ton. The temperature profile and moulding parameters are reported in the following table 2.
[Table 0002]
[Table]

TABLE 2

| Barrel temperature 1 | (° C.) | 230 |
|---|---|---|
| Barrel temperature 2 | (° C.) | 230 |
| Barrel temperature 3 | (° C.) | 235 |
| Barrel temperature 4 | (° C.) | 240 |
| Nozzle temperature | (° C.) | 240 |
| Mould temperature | (° C.) | 100 |
| Injection specific pressure | (kg/cm$^2$) | 857 |
| Hold specific pressure | (kg/cm$^2$) | 857 |
| Screw rotating speed | rpm | 50 |
| Injection speed | cm/s | 17.6 |
| Cycle time | s | 51 |

The moulded disks were found to possess a smooth surface, with no visible crack and/or surface defects. Also the high injection speed was a proof that the composition of the invention can be used in industrial machines at high speed rates without loosing productivity.

EXAMPLE 2

Comparative

Preparation of a per(halo)fluoropolymer

A 22 l AISI 316 autoclave equipped with a stirrer working at 500 rpm was evacuated and 14.5 l of demineralized water and 127 g of a microemulsion formed of: 20% by weight of GALDEN® D02, having the formula:

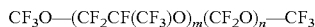

where m/n=20 and average molecular weight of 450;
30% by weight of a surfactant having the formula:

where n1=1.0% m1, q=9.1% m1 and average molecular weight of 550;
the remaining part being formed by $H_2O$,
were introduced in said autoclave.

The autoclave was evacuated and then heated to the reaction temperature of 75° C. Then ethane was charged as chain transfer agent with a delta pressure of 1.2 bar, MVE was charged with a delta pressure of 7.8 bar, and afterwards a TFE/MVE mixture containing 10% by moles of MVE was fed to obtain the reaction pressure of 21 absolute Bar.

The polymerization was initiated by introducing 100 ml of a potassium persulfate (KPS) solution, obtained by dissolving 6 g KPS in 1 liter of demineralized water.

The reaction pressure was kept constant by feeding the above described monomer mixture TFE/MVE containing 10% by moles of MVE After 255 minutes of reaction, the polymerization was stopped, the reactor was cooled to room temperature and the residual pressure was released.

A latex containing 260 (g polymer)/(kg latex) was discharged and coagulated with $HNO_3$; the polymer was then separated, washed with demineralized water and dried in an oven at 120° C. for about 16 hours.

The obtained powder was found to possess a dynamic viscosity of 105 Pa×s at 280° C. and at a shear rate of 1 rad×sec$^{-1}$, a $T_{m2}$ of 241° C., a $\Delta H_{2f}$=11.72 J/g and is composed of 12% by moles of MVE and 88% by moles of TFE

EXAMPLE 2B

Comparative

Melt Compounding Extrusion of a Composition of a Thermoplastic Hydrogen Containing Fluoropolymer and a Per(Halo)fluoropolymer A blend comprising a mixture of SOLEF® 6015 and 1% by weight of the TFE/MVE copolymer of example 2 were dry mixed for 5 hours in a rotary blender and melt compounded in a Braebender conical twin-screw Hastelloy C-276 extruder having a final diameter of 18 mm, as done in example 1b).

Pressure head at the extruder was found to be higher at similar throughput rate than that required for extruding composition of example 1b) (see table 1). At similar pressure as in example 1b) (75-85 bar), the throughput rate of the extruded composition of example 2 b) was found to be 10 to 20% less than in example 1b).

So efficiency of a per(halo)fluoropolymer having a dynamic viscosity exceeding 10 Pa×sec at 280° C. and 1 rad×sec$^{-1}$ was found to be inferior to that of similar MVE/TFE copolymer of dynamic viscosity of less than 10 Pa×sec.

FIG. 2 shows a SEM picture (magnification: 10000×) of a specimen taken from an extruded rod of the composition after fragile rupture at liquid nitrogen temperature white rods are discrete domains of the TFE/MVE copolymer.

As it can be seen in FIG. 2, the small domains mainly comprising TFE/MVE copolymer in the extruded rod were found to be not spherical but rod-like (unlike spherical domains found for extruded rod of example 1b) as in FIG. 1).

So the distribution of the interface between the VDF polymers and the MVE/TFE copolymer in this case (i.e. for per(halo)fluoropolymers having melt viscosity exceeding 10 Pa×sec at 280° C. and at a shear rate of 1 s$^{-1}$) was found to be much less homogeneous than in the case depicted in FIG. 1 when the copolymer MVE-TFE used was characterized by a melt viscosity of less than 10 Pa×s at 280° C. and at a shear rate of 1 s$^{-1}$.

It is understood that better distribution and uniformly distributed interface area generally lead to higher efficiency and then better processing.

The invention claimed is:

1. A thermoplastic fluoropolymer composition comprising:
at least one thermoplastic hydrogen-containing fluoropolymer (polymer (A)); and
from 0.1 to 10% by weight of polymer (A) of at least one tetrafluoroethylene (TFE)/perfluoromethylvinylether (MVE) copolymer consisting essentially of from 8 to 18% by moles of recurring units derived from MVE and from 92 to 82% by moles of recurring units derived from TFE and having a dynamic viscosity at a shear rate of 1 rad×sec$^{-1}$ of less than 6 Pa×sec at a temperature of 280° C. (polymer (B)), wherein
the polymer (A) is a vinylidene fluoride (VdF) polymer comprising:
(a') at least 60% by moles of vinylidene fluoride (VdF);
(b') optionally from 0.1 to 15% by moles of a fluorinated comonomer selected from the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE), and mixtures thereof; and
(c') optionally from 0.1 to 5%, by moles based on the total amount of monomers (a') and (b'), of one or more fluorinated or hydrogenated comonomer(s) and
wherein polymer (B) is present as phase-separated domains having a maximal dimension not exceeding 1 µm.

2. The composition according to claim 1, wherein the polymer (A) is a mixture of at least one VdF homopolymer and at least one VdF copolymer chosen among the group consisting of VdF copolymers comprising from 0.1 to 15% by moles of a fluorinated comonomer said fluorinated comonomer being selected from the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE), and mixtures thereof.

3. A process for manufacturing the thermoplastic fluoropolymer composition according to claim 1, said process comprising mixing:
the vinylidene fluoride (VdF) polymer (polymer (A));
the tetrafluoroethylene (TFE)/perfluoromethylvinylether (MVE) copolymer (polymer (B)); and
optionally, other additives or filling materials.

4. An article comprising the thermoplastic fluoropolymer composition of claim 1.

5. The article comprising the thermoplastic fluoropolymer composition obtained by the process according to claim 2.

6. The composition according to claim 1, wherein the polymer (A) is a VdF polymer comprising at least 75% by moles of vinylidene fluoride (VdF).

7. The composition according to claim 1, wherein the polymer (A) is a VdF polymer comprising at least 85% by moles of vinylidene fluoride (VdF).

8. The composition according to claim 1, wherein the polymer (A) is a mixture of at least one VdF homopolymer and at least one VdF copolymer chosen among the group consisting of VdF copolymers comprising from 0.1 to 12% by moles of a fluorinated comonomer, said fluorinated comonomer being selected from the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE), and mixtures thereof.

9. The composition according to claim 1, wherein the polymer (A) is a mixture of at least one VdF homopolymer and at least one VdF copolymer chosen among the group consisting of VdF copolymers comprising from 0.1 to 10% by moles of a fluorinated comonomer, said fluorinated comonomer being selected from the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE), and mixtures thereof.

10. The composition according to claim 1, wherein the polymer (B) is a tetrafluoroethylene (TFE)/perfluoromethylvinylether (MVE) copolymer consisting essentially of:
from 10 to 15% by moles of recurring units derived from MVE; and
from 90 to 85% by moles of recurring units derived from TFE.

* * * * *